(12) United States Patent
Danner et al.

(10) Patent No.: US 7,814,407 B1
(45) Date of Patent: Oct. 12, 2010

(54) METHOD AND SYSTEM FOR TREATING DATA

(75) Inventors: Matthew P. Danner, Charlotte, NC (US); John D. MacQueen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 903 days.

(21) Appl. No.: 11/553,138

(22) Filed: Oct. 26, 2006

(51) Int. Cl.
*G06F 17/00* (2006.01)
(52) U.S. Cl. ...................................... 715/213
(58) Field of Classification Search ............. 715/212, 715/219, 220, 216, 213
See application file for complete search history.

(56) References Cited

U.S. PATENT DOCUMENTS

| | | | | |
|---|---|---|---|---|
| 5,235,680 | A * | 8/1993 | Bijnagte | 1/1 |
| 5,390,296 | A * | 2/1995 | Crandall et al. | 715/835 |
| 5,461,708 | A * | 10/1995 | Kahn | 345/440 |
| 5,581,678 | A * | 12/1996 | Kahn | 345/440 |
| 5,971,854 | A * | 10/1999 | Pearson et al. | 463/41 |
| 7,127,672 | B1 * | 10/2006 | Patterson et al. | 715/220 |
| 7,451,397 | B2 * | 11/2008 | Weber et al. | 715/267 |
| 7,546,523 | B2 * | 6/2009 | Aureglia et al. | 715/218 |
| 2003/0135457 | A1 * | 7/2003 | Stewart et al. | 705/39 |
| 2003/0212953 | A1 * | 11/2003 | Serraf | 715/503 |
| 2003/0227487 | A1 * | 12/2003 | Hugh | 345/777 |
| 2004/0194019 | A1 * | 9/2004 | Mast et al. | 715/502 |
| 2005/0102192 | A1 * | 5/2005 | Gerrits et al. | 705/26 |
| 2005/0111562 | A1 * | 5/2005 | Koyanagi | 375/260 |
| 2007/0038933 | A1 * | 2/2007 | Luzzatto | 715/700 |
| 2009/0138449 | A1 * | 5/2009 | Rychener | 707/3 |
| 2009/0187816 | A1 * | 7/2009 | Aureglia et al. | 715/218 |
| 2010/0039499 | A1 * | 2/2010 | Nomura et al. | 348/43 |

OTHER PUBLICATIONS

Sutherland et al., Power System Studies through the Internet, IEEE 2001, pp. 44-49.*
Mintert et al., Improving Efficiency in Business-to-Business Information Transfer: a Web-based Solution in the Beef Sector, Google 2003, pp. 415-424.*

* cited by examiner

*Primary Examiner*—Cong-Lac Huynh
(74) *Attorney, Agent, or Firm*—Michael A. Springs; Moore & Van Allen PLLC

(57) ABSTRACT

A method for displaying and employing data includes: (a) Defining an array of data sites in a first domain. The defining includes establishing procedures for manipulating the data located at the data sites. (b) Importing the data from a data source in a second domain to the array. (c) Installing the data in selected the data sites according to predetermined installation criteria. The employing is effected according to the procedures for manipulating.

15 Claims, 10 Drawing Sheets

METHOD AND SYSTEM FOR TREATING DATA

CROSS REFERENCE TO RELATED APPLICATION

The present application is related to U.S. patent application Ser. No. 11/553,288 entitled "METHOD AND SYSTEM FOR ALTERING DATA DURING NAVIGATION BETWEEN DATA CELLS," filed on the same date as the present application, Oct. 26, 2006, and assigned to the current assignee hereof.

BACKGROUND OF THE INVENTION

The present invention is directed to displaying, employing and otherwise treating data, and especially to treating data imported from one domain to an array of data sites defined in another domain.

For purposes of this description, the term "treating" data is intended herein to refer to importing, copying, moving, combining and mathematically or otherwise manipulating, calculating or handling data.

Treating data is an important function of business in various endeavors. By way of example and not by way of limitation, this description will address endeavors involving numerical data. More specifically, this description will address exemplary endeavors involving financial data. Other data may be advantageously treated using the present invention as can be understood by those skilled in the art of data handling systems and methods, such as computer program, computer system and computer method designers.

Prior art methods and systems for treating financial data have employed data treatment tools such as spreadsheets to view general ledger numerical data. However, programs employed for creating, generating or otherwise originating general ledger data used in the spreadsheets have provided data incompatible with the spreadsheet in some regard. By way of example and not by way of limitation, a first software program may generate financial results in a data format that may be imported, copied, pasted or otherwise provided for use in a spreadsheet. However, it was first necessary to adjust columns or rows in the receiving spreadsheet or otherwise recast the receiving spreadsheet to accommodate certain attributes of the imported data. Failure to properly accommodate attributes of imported data could result in lost results, improper results or other anomalies resulting from combining the newly-imported data with data previously residing in the spreadsheet. Data residing in a spreadsheet may include data in a data base from which a spreadsheet program picks data for filling the spreadsheet according to predetermined protocol.

A receiving spreadsheet may be employed in a shared mode among various sites in a business. Such sharing may be carried out in a private network or in a public network, such as the Internet. Establishing data with appropriate attributes to effect such network sharing adds another set of characteristics that must be accommodated when recasting a receiving spreadsheet to receive imported data.

Recasting a receiving spreadsheet to accommodate newly-imported data appropriately to maintain operational integrity by the receiving spreadsheet can be a time consuming and frustrating experience that users would prefer to avoid.

There is a need for a method and system for treating data that accommodates importing data to a receiving data treatment tool while substantially retaining operational integrity of the receiving data treatment tool without requiring substantial recasting of the receiving data treatment tool.

SUMMARY OF THE INVENTION

A method for displaying and employing data includes: (a) Defining an array of data sites in a first domain. The defining includes establishing procedures for manipulating the data located at the data sites. (b) Importing the data from a data source in a second domain to the array. (c) Installing the data in selected the data sites according to predetermined installation criteria. The employing is effected according to the procedures for manipulating.

A system for treating data includes an array of a plurality of data sites in a first domain. Selected data sites of the plurality of data sites are defined to include procedures for manipulating the data located at the selected data sites. At least a portion of the data is imported data imported from a data source in a second domain to the array. The imported data is installed in the selected data sites according to predetermined installation criteria. The treating is effected according to the procedures for manipulating.

It is, therefore, a feature of the present invention to provide a method and system for treating data that accommodates importing data to a receiving data treatment tool, such as a spreadsheet program, while substantially retaining operational integrity of the receiving data treatment tool without requiring substantial recasting of the receiving data treatment tool.

Further features of the present invention will be apparent from the following specification and claims when considered in connection with the accompanying drawings, in which like elements are labeled using like reference numerals in the various figures, illustrating the example embodiments of the invention.

DETAILED DESCRIPTION OF THE EXAMPLE EMBODIMENT

Figure 1:
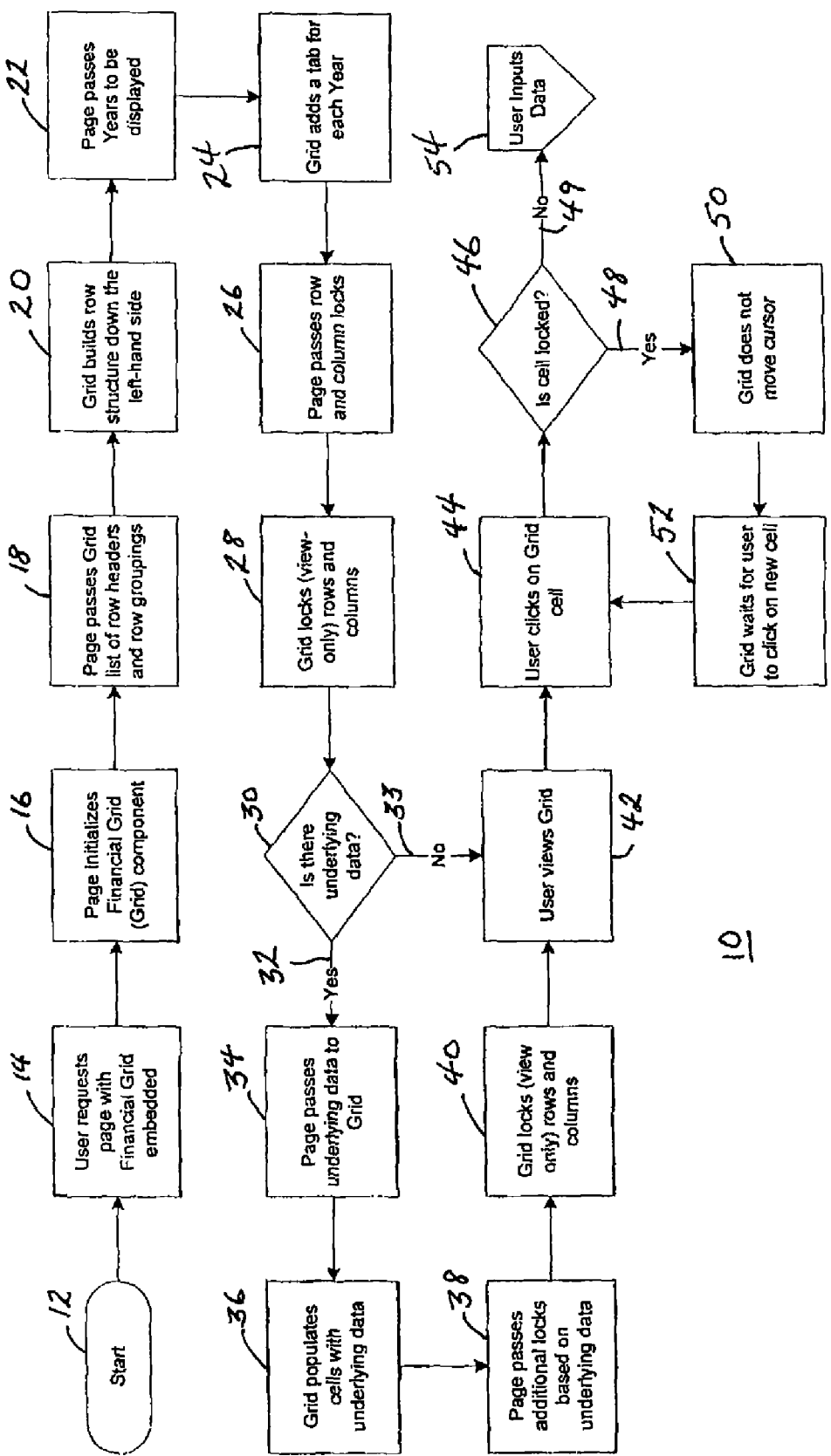
FIG. 1 is a process flow chart illustrating a process for displaying data in a financial grid page in response to a request from a user.

The term "locus" is intended herein to indicate a place, location, locality, locale, point, position, site, spot, volume, juncture, junction or other identifiable location-related zone in one or more dimensions. A locus in a physical apparatus may include, by way of example and not by way of limitation, a corner, intersection, curve, line, area, plane, volume or a portion of any of those features. A locus in an electrical apparatus may include, by way of example and not by way of limitation, a terminal, wire, circuit, circuit trace, circuit board, wiring board, pin, connector, component, collection of components, sub-component or other identifiable location-related area in one or more dimensions. A locus in a flow chart may include, by way of example and not by way of limitation, a juncture, step, site, function, query, response or other aspect, step, increment or an interstice between junctures, steps, sites, functions, queries, responses or other aspects of the flow or method represented by the chart.

The present invention is a method and system for treating data that establishes an array of data cells for receiving and manipulating or treating data. The array of data cells is preferably arranged in a plurality of rows and columns established in a first domain according to a first format or data protocol. Data may be imported, copied, pasted or otherwise transferred to selected data cells of the plurality of data cells from a data source. The data source is established according to a second format or data protocol. An important characteristic of the present invention is that the method and system are data driven, or data bound. By that is meant that, in the example embodiment of the invention, the receiving data array is established in a first domain according to a first format or first data protocol. Data that is imported to the receiving data array is qualified substantially simultaneously with its entry, copying or other importing to the respective receiving data cells. The qualifying implements predetermined attributes to effect certain treatments of the imported data such as by way of example and not by way of limitation, stripping non-numerical characters from the data, truncating the data to a predetermined decimal place (e.g., truncating to the third decimal place) or assigning other attributes to the imported data to assure its compatibility for operations within the first domain. Calculations and other data-handling functions for the receiving data array can be configured as functions of the receiving data array rather than as a function of the imported data.

In one embodiment, the first domain is associated with a web environment, such as the Internet. Establishing the receiving data array as compatible with a web page rather than as a stand-alone application assures that the receiving data array is web-enabled so that no functionality is lost when the receiving data array is employed as part of a web page. Such web-compatibility is particularly valuable when sharing the receiving data array among remotely located positions, such as by way of example and not by way of limitation, geographically remote branches of a banking institution. Associating the receiving data array or grid with a web environment effectively permits the grid to mimic a stand-alone product in a web environment while allowing system developers to exercise control over user interaction with the data entered into the grid. Associating the receiving data array or grid with a web environment permits users to access and use data in the receiving data array using just a web browser program. No separate program is required for accessing and using the program from which data is imported.

A method and system configured according to the teachings of the present invention permits use of a receiving data array by users at the remote branches. Users may enter, copy, paste or otherwise add data to the data-bound receiving data array for use in consolidating statements or other reports with no requirement for extensive, frustrating, time-consuming and error-prone reworking of the receiving data array to accommodate newly added or imported data from various branches. This result is assured by the method and system of the present invention by validating or qualifying new data to implement predetermined attributes substantially simultaneously with its entry into the receiving data array. By "substantially simultaneously" is meant just before, upon or shortly after entry of the new data into the receiving data array. In any event, "substantially simultaneously" means that the newly included data is validated or qualified for use in the domain of the receiving data array before the new data is involved in any calculations.

The example embodiment of the invention provides a capability for dynamic totaling and sub-totaling so that all sub-total and total calculations in the receiving data array are recalculated and updated whenever any data in any data cell in the receiving data array is changed.

In the example embodiment of the present invention, copying and pasting of individual cells, rows or portions of rows, columns or portions of columns or other subsets of data may be carried out. An important feature is that whatever new data is inserted into the receiving data array, the new data is validated or qualified substantially simultaneously with its entry into the receiving data array.

The inventor has found that, by way of example and not by way of limitation, data in a second domain that is expressed in an XML (Extensible Mark-up Language) compatible format may be straightforwardly imported to an XML-compatible formatted first domain data array. XML is a standardized way of tagging data so the tagged data can be read and interpreted by a variety of web browsers, software, servers or clients regardless of how the data is created.

A feature of some embodiments of the present invention is a capability to deny access by a user to predetermined data cells of the receiving data array. By way of example and not by way of limitation, a system designer may permit a user to enter data to effect altering current or future budget items or current-month expenses, but access may be denied to cells that affect past months' data entries. Further, users can be denied access to cells containing total or sub-total values. Total and sub-total entries can be calculated entries not alterable by direct data entry to the total or sub-total cells.

Another feature that may be desired in the method or system of the present invention is a provision that data may be pulled or accessed for use by the receiving data array from a data source, such as a data base containing the data for carrying out data calculations or other operations. In contrast, data provided as a user input (e.g., by direct entry, copying, pasting or the like) will not change the associated entry in the data base unless and until a predetermined entry procedure is exercised. By way of example and not by way of limitation, a system designer may provide that a "Save For Later" button or command may initiate a saving of a user-input data entry to a transaction layer, but not change underlying corresponding data in a data base. Corresponding data in a data base may be changed using an alternate predetermined entry procedure such as, by way of example and not by way of limitation, actuating a "Save" button or command. Such a two-tier handling of data is particularly useful for carrying out "what-if"

inquiries for evaluating alternate scenarios using user-provided data in the receiving data array.

Another feature of the example embodiment of the invention is a display arrangement that alters the display as a user moves from one data cell to another data cell. Data is displayed in inactive cells (i.e., cells not highlighted or otherwise indicated by a user) are rounded. This feature saves screen space. Highlighted or otherwise user-indicated data cells show data to full precision, such as by way of example and not by way of limitation to three decimal places.

Because the display of the invention is data bound, tabbing between years or between other portions of data categories effects substantially instantaneous updating of viewed data. Further, because the predetermined attribute rules are configured in the receiving data array, when a user tabs or otherwise moves across divisions of the receiving data array, such as between years, between pages or similar inter-division moves, there is no need to reconfigure the data or page.

FIG. 1 is a process flow chart illustrating a process for displaying data in a financial grid page in response to a request from a user. In FIG. 1, a process 10 begins at a "Start" locus 12. Process 10 continues with a user requesting a page with a financial grid, or receiving data array embedded, as indicated by a block 14. The page initializes the financial grid component in a first domain, as indicated by a block 16. In the example embodiment of process 10 the financial grid component is initialized in a web-compatible domain. Next the page passes the grid (i.e., the receiving data array) a list of row headers and row groupings, as indicated by a block 18, and the grid builds the row structure, preferably along the left-hand side of the grid, as indicated by a block 20.

The page next passes years to be displayed, as indicated by a block 22. The grid provides a tab for each year passed according to block 22, as indicated by a block 24. The page passes row and column locks to the grid, as indicated by a block 26. The grid locks predetermined rows and columns as "view only", as indicated by a block 28. One may observe that blocks 14-28 effect formatting of the grid and establish predetermined data handling limits for parts of the grid.

Process 10 continues by posing a query whether there is underlying data to be transferred to the grid, as indicated by a query block 30. If there is underlying data to be transferred to the grid, process 10 proceeds from query block 30 via "Yes" response line 32 and the page passes underlying data to the grid, as indicated by a block 34. The grid then populates appropriate data cells with the received underlying data, as indicated by a block 36. The page passes additional locks that may be associated with the underlying data to the grid, as indicated by a block 38. The grid locks appropriate additional rows and columns as "view only" to implement the received additional locks, as indicated by a block 40. The user may then view the newly updated grid populated with the underlying data and implementing additional locks based on the underlying data, as indicated by a block 42. One may observe that blocks 34-40 effect populating the grid with newly received underlying data and importing to the grid any additional limits associated with the newly received data.

If there is no underlying data to be transferred to the grid, process 10 proceeds from query block 30 via "No" response line 33 and the user may view the grid, as indicated by a block 42.

Process 10 continues with the user clicking or otherwise indicating or selecting an individual grid cell in the grid, as indicated by a block 44. Process 10 continues by posing a query whether the cell selected according to block 44 is locked, as indicated by a query block 46. If the selected cell is locked, process 10 proceeds from query block 46 via "Yes" response line 48 and the grid does not move the cursor according to the user's indication (block 44), as indicated by a block 50. The grid thereafter awaits a new indication by the user, as indicated by a block 52. If the user indicates or selects another cell (block 44), process 10 proceeds to query block 46 to inquire anew whether the newly-selected cell is locked. If the selected cell is not locked, process 10 proceeds from query block 46 via "No" response line 49 and the user may input data to the newly-selected cell, as indicated by a block 54. One may observe that blocks 44-54 effect permitting user access to data cells in the grid within limits. The limits may be established during initializing and formatting the grid (blocks 14-28) or limits may be acquired with underlying data (blocks 38-40).

Figure 2:
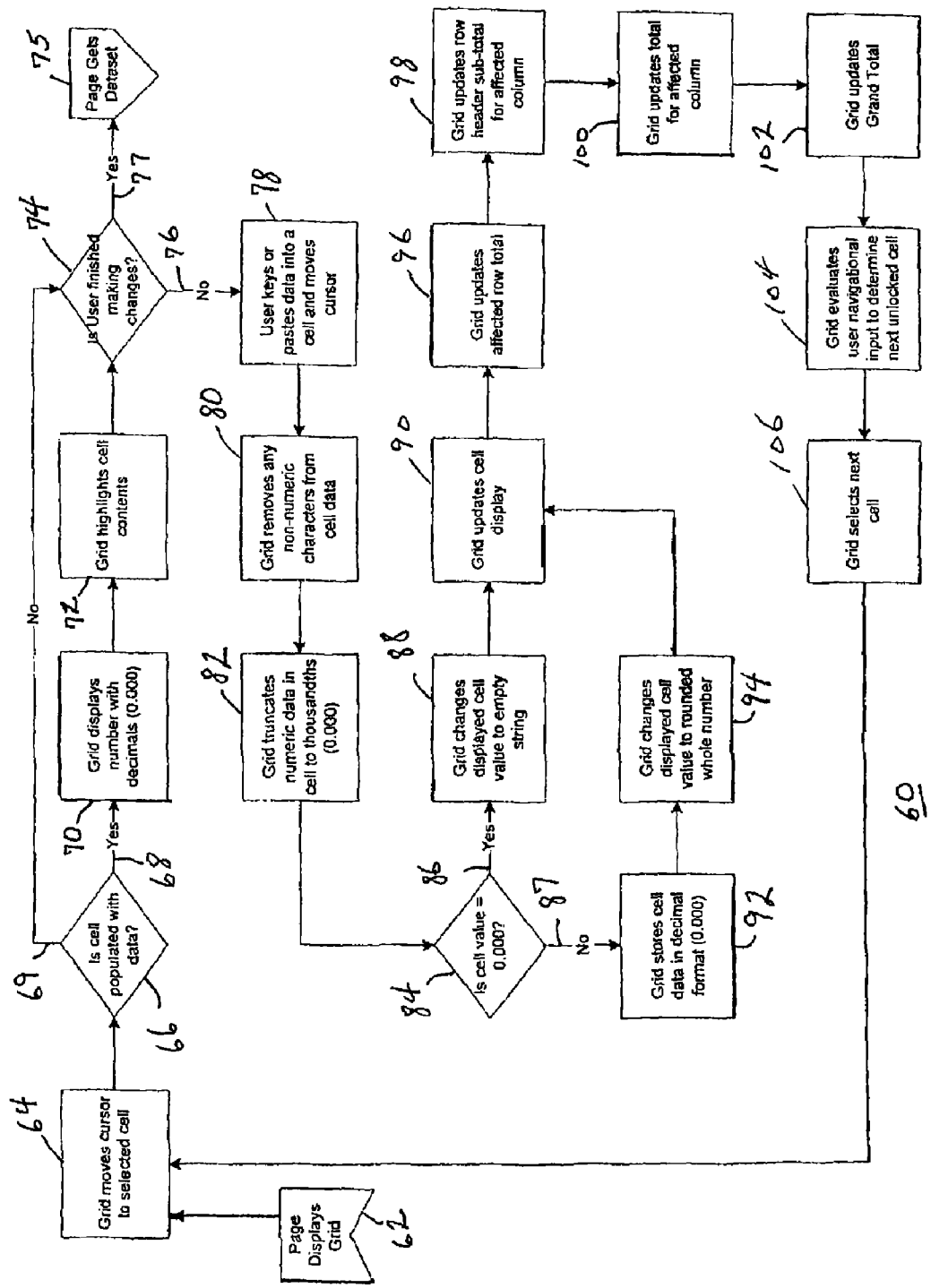
FIG. 2 is a process flow chart illustrating a process by which a user alters data in a financial grid.

FIG. 2 is a process flow chart illustrating a process by which a user alters data in a financial grid. In FIG. 2, a process 60 begins when a page displays a receiving data array or grid, as indicated by a block 62. Block 62 represents process 10, described herein in connection with FIG. 1. Process 60 continues with the grid moving a cursor in response to input by a user to a selected call in the array of data cells, as indicated by a block 64. The input provided by the user may be provided using a mouse input device, by a keyboard key or keys or by another input device.

Process 60 continues by posing a query whether the selected cell is populated with data, as indicated by a query block 66. If the selected cell is populated with data, process 60 proceeds from query block 66 via "Yes" response line 68 and the grid displays the data in the selected cell. In the exemplary embodiment illustrated in FIG. 2 the data in the selected cell is numerical data, and the grid displays the number in the selected cell to three decimal places, as indicated by a block 70. The grid highlights the contents of the selected cell, as indicated by a block 72. Process 60 continues by posing a query whether the user has finished making changes, as indicated by a query block 74. If the selected cell is not populated with data, process 60 proceeds from query block 66 via "No" response line 69 directly to query block 74. One may observe that blocks 64-72 establish extant cell contents within a selected cell in a grid.

If the user has finished making changes, process 60 proceeds from query block 74 via "yes" response line 77 and process proceeds to another process, "Page Gets Dataset" (see FIG. 3), as indicated by a block 75. If the user has not finished making changes, process 60 proceeds from query block 74 via "No" response line 76 and the user may key in or paste or otherwise enter data into a cell and move the cursor to indicate a new selected cell, as indicated by a block 78. Process 60 continues with the grid removing any non-numeric characters from the data entered by the user (block 78) in the new selected cell, as indicated by a block 80. The grid then truncates numeric data contained in the new selected cell to the third decimal place, as indicated by a block 82. One may observe that blocks 78-82 effect entry of data into a new selected data cell by a user (block 78) and validate or qualify the newly entered data according to predetermined attributes (blocks 80-82).

Process 60 continues by posing a query whether the value of the data in the new selected cell is equal to zero, as indicated by a query block 84. If the value of the data in the new selected cell is equal to zero, process 60 proceeds from query block 84 via "Yes" response line 86 and the grid changes the displayed cell value for the new selected cell to an empty string, as indicated by a block 88. The grid thereafter updates the cell display for the new selected cell to reflect the change in displayed value (block 88), as indicated by a block 90. If the value of the data in the new selected cell is not equal to zero, process 60 proceeds from query block 84 via "No" response line 87 and the grid stores the data in the new selected cell in decimal format, as indicated by a block 92. The grid changes the displayed cell value for the new selected cell to a rounded whole number representing the contents of the new selected data cell, as indicated by a block 94. The grid thereafter updates the cell display for the new selected cell to reflect the change in displayed value (block 94), as indicated by a block 90.

The grid then updates the row total for the row containing the new selected data cell, as indicated by a block 96. The grid then updates the row header sub-total for the column containing the new selected data cell, as indicated by a block 98. The grid then updates the total for the column containing the new selected data cell, as indicated by a block 100. The grid then updates the grand total, as indicated by a block 102. One may observe that blocks 96-102 effect dynamic totaling and sub-totaling by the grid upon a change of data in the new selected data cell.

The grid next evaluates a new user navigational input to determine a next unlocked data cell, as indicated by a block 104. The grid selects the next unlocked cell to which the user may navigate, as indicated by a block 106. The grid moves the cursor to the next unlocked cell, as indicated by block 64, and process 60 continues as described above until a "Yes" response is appropriate for the query posed by query block 74, and process 60 continues with the process described below in connection with FIG. 3.

Figure 3:
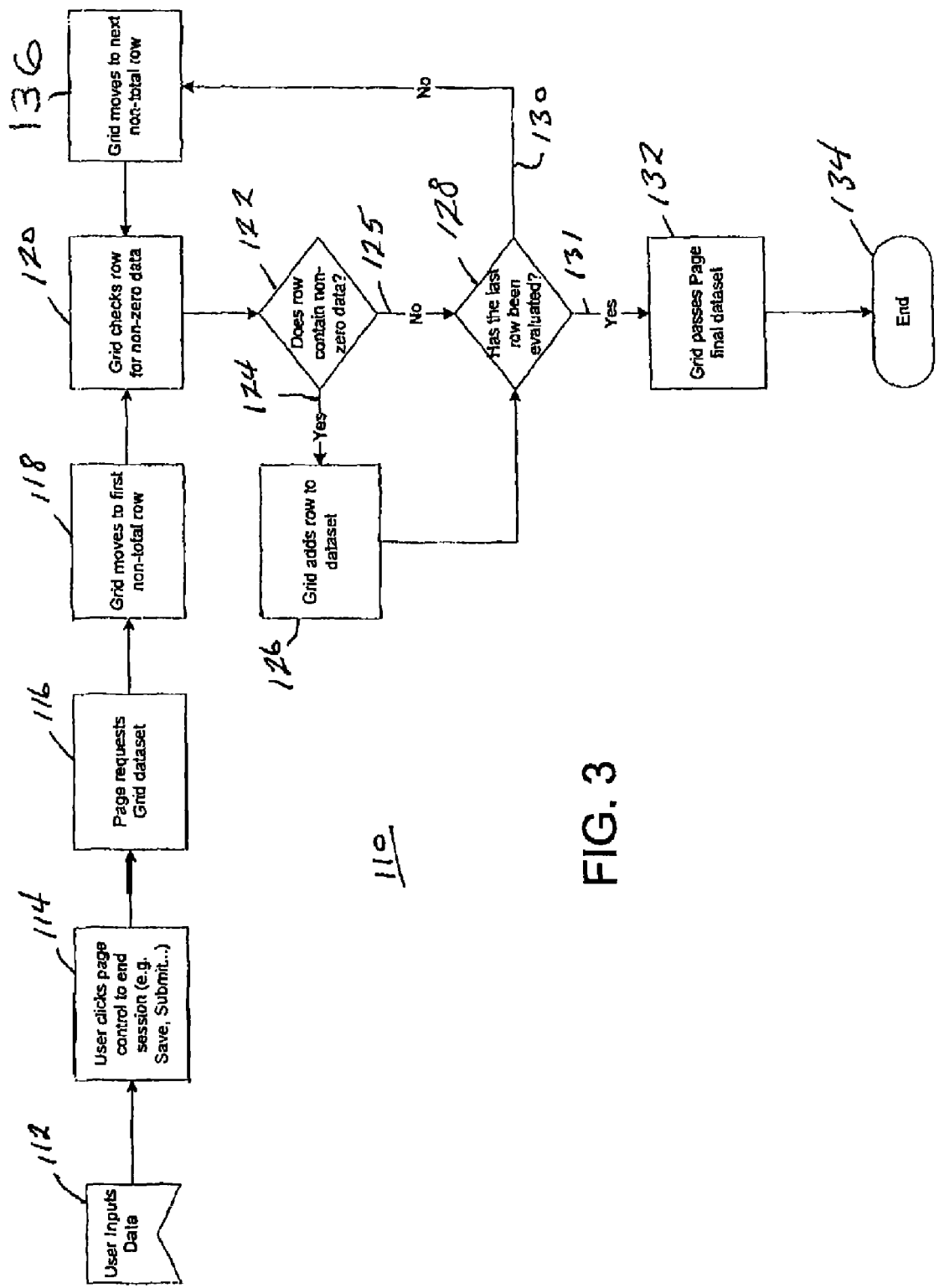
FIG. 3 is a process flow chart illustrating a process by which a user accesses data in a financial grid.

FIG. 3 is a process flow chart illustrating a process by which a user accesses data in a financial grid. In FIG. 3, a process 110 begins when a user inputs data, as indicated by a block 112. Block 112 represents process 60, described herein in connection with FIG. 2. Process 110 continues with the user executing a page control command to end the extant session, as indicated by a block 114. Executing the page control command may be effected, by way of example and not by way of limitation, by a mouse click, by an actuation of a key or keys of a keyboard or by another input device actuation.

Process 110 continues with the page requesting a grid dataset, as indicated by a block 116. The grid then selects a first non-total row (as indicated by a block 118) and checks the selected non-total row for non-zero data (as indicated by a block 120).

Process 110 continues by posing a query whether the selected non-total row contains non-zero data, as indicated by a query block 122. If the selected non-total row contains non-zero data, process 110 proceeds from query block 122 via "Yes" response line 124 and the grid adds the row to the dataset that was requested according to block 126. In the exemplary embodiment illustrated in FIG. 3 the data in the dataset and in the non-total row is numerical data.

Process 110 continues by posing a query whether the last row has been evaluated, as indicated by a query block 128. If the selected non-total row does not contain non-zero data, process 110 proceeds from query block 122 via "No" response line 125 to query block 128. If the selected non-total row is the last row to be evaluated, process 110 proceeds from query block 128 via "Yes" response line 131, the grid passes the page final dataset to memory (as indicated by a block 132) and process 110 ends at an "End" locus 134. If the selected non-total row is not the last row to be evaluated, process 110 proceeds from query block 128 via "No" response line 130, the grid moves to a next selected non-total row (as indicated by a block 136), checks the next selected non-total row for non-zero data (block 120) and proceeds thereafter as previously described.

Figure 4:
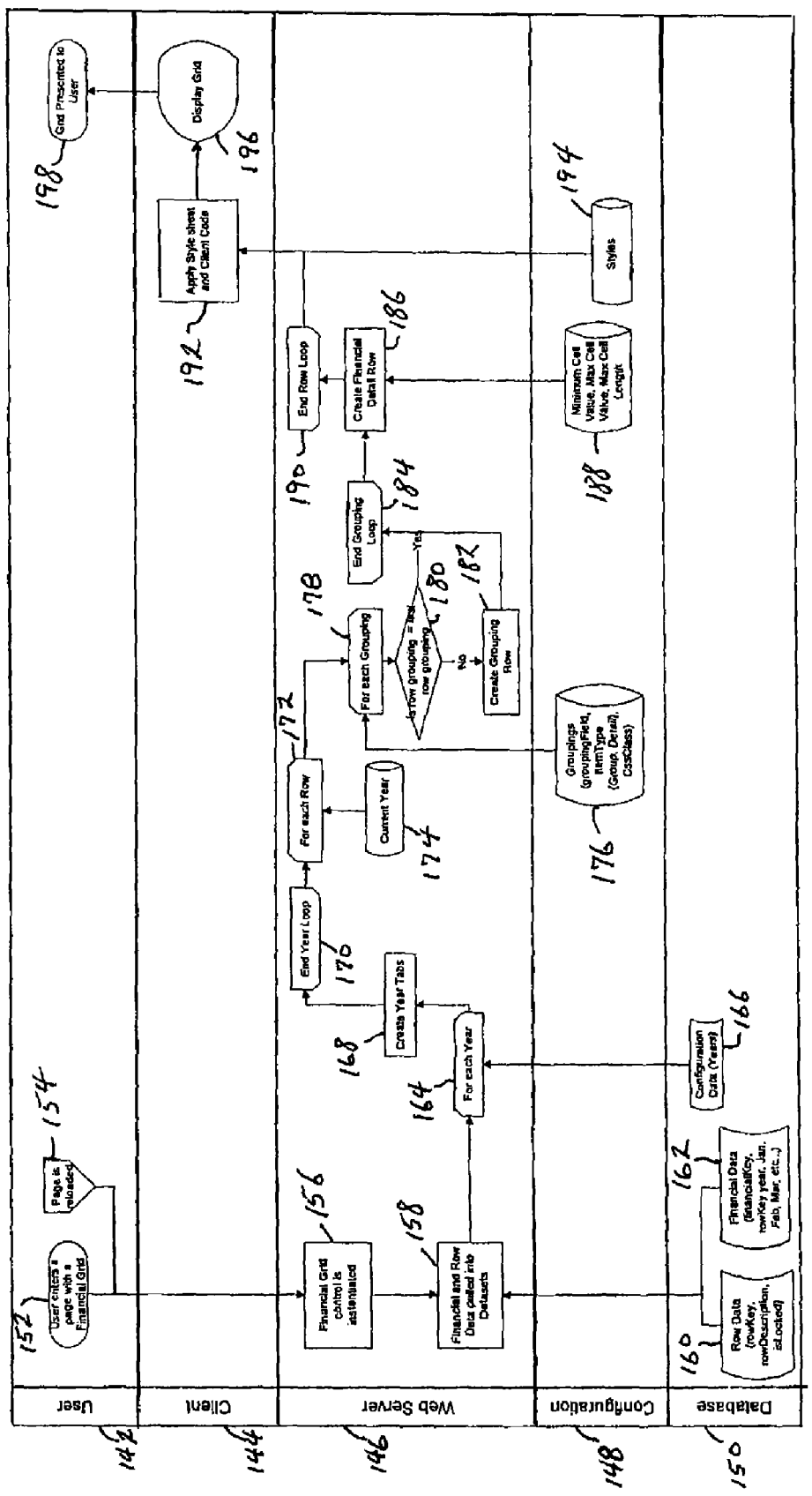
FIG. 4 is a system flow chart illustrating loading of data into a financial grid, with horizontal "swim lanes" indicating respective participants effecting particular actions.

FIG. 4 is a system flow chart illustrating loading of data into a financial grid, with horizontal "swim lanes" indicating respective participants effecting particular actions. In FIG. 4, a system flow 140 includes a user "swim lane" 142, a client "swim lane" 144, a web server "swim lane" 146, a configuration "swim lane" 148 and a database "swim lane" 150. Location of a flow element within a respective swim lane 142, 144, 146, 148, 150 is intended to indicate that the function represented by the flow element is effected by the entity related with the respective swim lane.

System flow 140 begins in user swim lane 142 with a user selecting and entering a page with a financial grid, as indicated by a flow element 152, and the system loads the user-selected page, as indicated by a flow element 154. The web server responds to the user direction or selection by establishing or instantiating an appropriate financial grid control routine in support of the user's selection, as indicated by a flow element 156 in web server swim lane 146. As indicated by a flow element 158 in web server swim lane 146, the web server pulls data from data bases 160, 162 (data base swim lane 150) to begin loading the financial grid according to the financial grid control routine (flow element 156). Data from data bases 160, 164 is collected by year as indicated by cooperation of flow element 164 (web server swim lane 146) and flow element 166 (data base swim lane 150).

System flow 140 continues in web server swim lane 146 with the web server creating year tabs (flow element 168), establishing an end-year loop (flow element 170) for each row (flow element 172) for the current year (flow element 174). The web server obtains groupings established during configuration of the financial grid, as indicated by a flow element 176 (configuration swim lane 148) to establish an appropriate row-grouping arrangement, as indicated by flow elements 178, 180, 182, 184. A financial detail row is thus created, as indicated by a flow element 186 (web server swim lane 146) according to characteristics established during configuration of the financial grid, as indicated by a flow element 188 (configuration swim lane 148). When flow elements 178, 180, 182, 184, 186 have been addressed for each row (as indicated by flow element 172), the row loop for establishing the financial grid according to the financial grid control (flow element 156) is completed, as indicated by a flow element 190.

The client server thereafter applies a style sheet and client code overlay to the financial grid, as indicated by a flow element 192 (client swim lane 144) using styles established during configuration of the financial grid, as indicated by a flow element 194 (configuration swim lane 148). The client server then may display the competed financial grid, as indicated by a flow element 196 (client swim lane 144) and the grid is thereafter presented to the user, as indicated by a flow element 198 (user swim lane 142).

Figure 5:
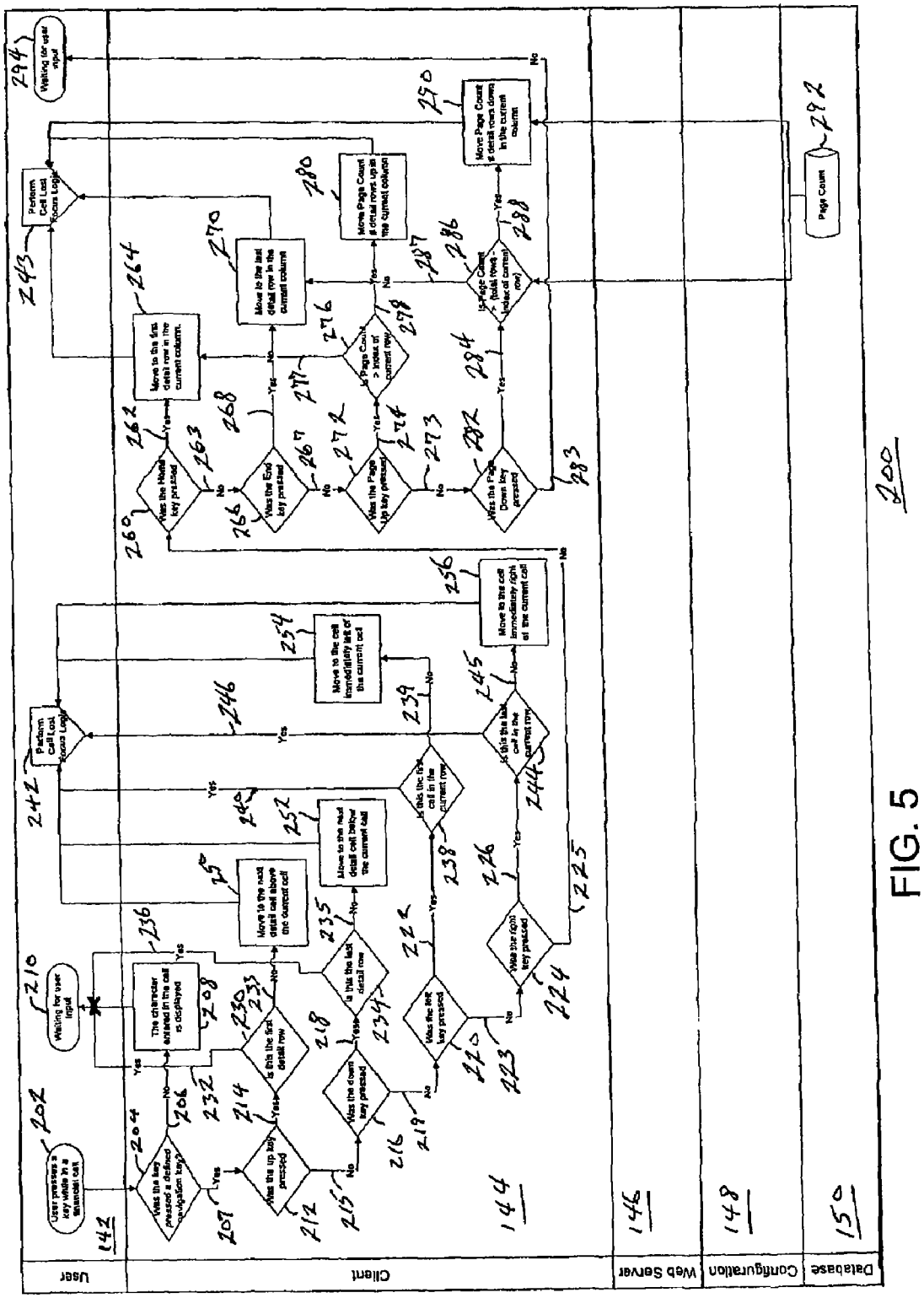
FIG. 5 is a system flow chart illustrating effecting navigation by a user with a financial grid, with horizontal "swim lanes" indicating respective participants effecting particular action.

FIG. 5 is a system flow chart illustrating effecting navigation by a user with a financial grid, with horizontal "swim lanes" indicating respective participants effecting particular action. In FIG. 5, a system flow 200 includes swim lane indications 142, 144, 146, 148, 150 substantially similar to swim lanes indicated in FIG. 4. Location of a flow element within a respective swim lane 142, 144, 146, 148, 150 is intended to indicate that the function represented by the flow element is effected by the entity related with the respective swim lane.

System flow 200 begins in user swim lane 142 with a user effecting an indication such as by pressing or actuating a key while in a selected data cell, as indicated by a flow element 202. The client server (client swim lane 144) first inquires whether the actuated key is a defined navigation key, as indicated by a flow element 204. If the actuated key is not a navigation key, the system proceeds from flow element 204 via a "No" response line 206 to enable display of the character in the selected data cell (as indicated by a flow element 208) and the system awaits another user input, as indicated by a flow element 210 (user swim lane 142). If the actuated key is a navigation key, the system proceeds from flow element 204 via a "Yes" response line 207 to inquire whether the key pressed was the "Up" key (as indicated by a flow element 212). If the key pressed was the "Up" key, system flow 200 proceeds from flow element 212 via "Yes" response line 214 to inquire whether the detail addressed is the first detail row, as indicated by a flow element 230. If the detail addressed is the first detail row, system flow 200 proceeds from flow element 230 via "Yes" response line 232 and the system awaits another user input, as indicated by a flow element 210 (user swim lane 142).

If the key pressed was not the "Up" key, system flow 200 proceeds from flow element 212 via "No" response line 215 to inquire whether the key pressed was the "Down" key (as indicated by a flow element 216). If the key pressed was the "Down" key, system flow 200 proceeds from flow element 216 via "Yes" response line 218 to inquire whether the detail addressed is the last detail row, as indicated by a flow element 234. If the detail addressed is the last detail row, system flow 200 proceeds from flow element 234 via "Yes" response line 236 and the system awaits another user input, as indicated by a flow element 210 (user swim lane 142).

If the key pressed was not the "Down" key, system flow 200 proceeds from flow element 216 via "No" response line 219 to inquire whether the key pressed was the "Left" key (as indicated by a flow element 220). If the key pressed was the "Left" key, system flow 200 proceeds from flow element 220 via "Yes" response line 222 to inquire whether the detail addressed is the first cell in the current row, as indicated by a flow element 238. If the detail addressed is the first cell in the current row, system flow 200 proceeds from flow element 238 via "Yes" response line 240 and the system performs a "Cell Lost Focus Logic" routine (see FIG. 6), as indicated by a flow element 242 (user swim lane 142).

If the key pressed was not the "Left" key, system flow 200 proceeds from flow element 220 via "No" response line 223 to inquire whether the key pressed was the "Right" key, as indicated by a flow element 224. If the key pressed was the "Right" key, system flow 200 proceeds from flow element 224 via "Yes" response line 226 to inquire whether the detail addressed is the last cell in the current row, as indicated by a flow element 244. If the detail addressed is the last cell in the current row, system flow 200 proceeds from flow element 244 via "Yes" response line 246 and the system performs a "Cell Lost Focus Logic" routine (see FIG. 6), as indicated by a flow element 242 (user swim lane 142).

If the key pressed was the "Up" key and the detail addressed is not the first detail row, system flow 200 proceeds from flow element 230 via "No" response line 233, the system moves to the next detail cell above the current cell (as indicated by a flow element 250) and thereafter the system performs a "Cell Lost Focus Logic" routine (see FIG. 6), as indicated by a flow element 242 (user swim lane 142).

If the key pressed was the "Down" key and the detail addressed is not the last detail row, system flow 200 proceeds from flow element 234 via "No" response line 235, the system moves to the next detail cell below the current cell (as indicated by a flow element 252) and thereafter the system performs a "Cell Lost Focus Logic" routine (see FIG. 6), as indicated by a flow element 242 (user swim lane 142).

If the key pressed was the "Left" key and the detail addressed is not the first cell in the current row, system flow 200 proceeds from flow element 238 via "No" response line 239, the system moves to the cell immediately left of the current cell (as indicated by a flow element 254) and thereafter the system performs a "Cell Lost Focus Logic" routine (see FIG. 6), as indicated by a flow element 242 (user swim lane 142).

If the key pressed was the "Right" key and the detail addressed is not the last cell in the current row, system flow 200 proceeds from flow element 244 via "No" response line 245, the system moves to the cell immediately right of the current cell (as indicated by a flow element 256) and thereafter the system performs a "Cell Lost Focus Logic" routine (see FIG. 6), as indicated by a flow element 242 (user swim lane 142).

If the key pressed was not the "Right" key, system flow 200 proceeds from flow element 224 via "No" response line 225 to inquire whether the key pressed was the "Home" key, as indicated by a flow element 260. If the key pressed was the "Home" key, system flow 200 proceeds from flow element 260 via "Yes" response line 262, the system moves to the first detail row in the current column (as indicated by a flow element 264) and thereafter the system performs a "Cell Lost Focus Logic" routine (see FIG. 6), as indicated by a flow element 243 (user swim lane 142).

If the key pressed was not the "Home" key, system flow 200 proceeds from flow element 260 via "No" response line 263 to inquire whether the key pressed was the "End" key, as indicated by a flow element 266. If the key pressed was the "End" key, system flow 200 proceeds from flow element 266 via "Yes" response line 268, the system moves to the last detail row in the current column (as indicated by a flow element 270) and thereafter the system performs a "Cell Lost Focus Logic" routine (see FIG. 6), as indicated by a flow element 243 (user swim lane 142).

If the key pressed was not the "End" key, system flow 200 proceeds from flow element 266 via "No" response line 267 to inquire whether the key pressed was the "Page Up" key, as indicated by a flow element 272. If the key pressed was the "Page Up" key, system flow 200 proceeds from flow element 272 via "Yes" response line 274 and the system inquires whether the page count is greater than the index of the current row, as indicated by a flow element 276. If the page count is greater than the index of the current row, system flow 200 proceeds from flow element 276 via "Yes" response line 278, system 200 moves the page count number detail rows up in the current column (as indicated by a flow element 280) and thereafter the system performs a "Cell Lost Focus Logic" routine (see FIG. 6), as indicated by a flow element 243 (user swim lane 142). If the page count is not greater than the index of the current row, system flow 200 proceeds from flow element 276 via "No" response line 277, system 200 moves to the first detail row in the current column (as indicated by flow element 264) and thereafter the system performs a "Cell Lost Focus Logic" routine (see FIG. 6), as indicated by a flow element 243 (user swim lane 142).

If the key pressed was not the "Page Up" key, system flow 200 proceeds from flow element 272 via "No" response line 273 to inquire whether the key pressed was the "Page Down" key, as indicated by a flow element 282. If the key pressed was the "Page Down" key, system flow 200 proceeds from flow element 282 via "Yes" response line 284 and the system inquires whether the page count is greater than the total number of rows less the index of the current row, as indicated by a flow element 286. If the page count is greater than the total number of rows less the index of the current row, system flow 200 proceeds from flow element 286 via "Yes" response line 288, system 200 moves the page count number detail rows down in the current column (as indicated by a flow element 290) and thereafter the system performs a "Cell Lost Focus Logic" routine (see FIG. 6), as indicated by a flow element 243 (user swim lane 142). If the page count is not greater than the total number of rows less the index of the current row, system flow 200 proceeds from flow element 286 via "No" response line 287, system 200 moves to the last detail row in the current column (as indicated by flow element 270) and thereafter the system performs a "Cell Lost Focus Logic" routine (see FIG. 6), as indicated by a flow element 243 (user swim lane 142). Page count information may be provided from a data base 292 (data base swim lane 150).

If the key pressed was not the "Page Down" key, system flow 200 proceeds from flow element 282 via "No" response line 283 and system 200 awaits another user input, as indicated by a flow element 294 (user swim lane 142).

Figure 6:
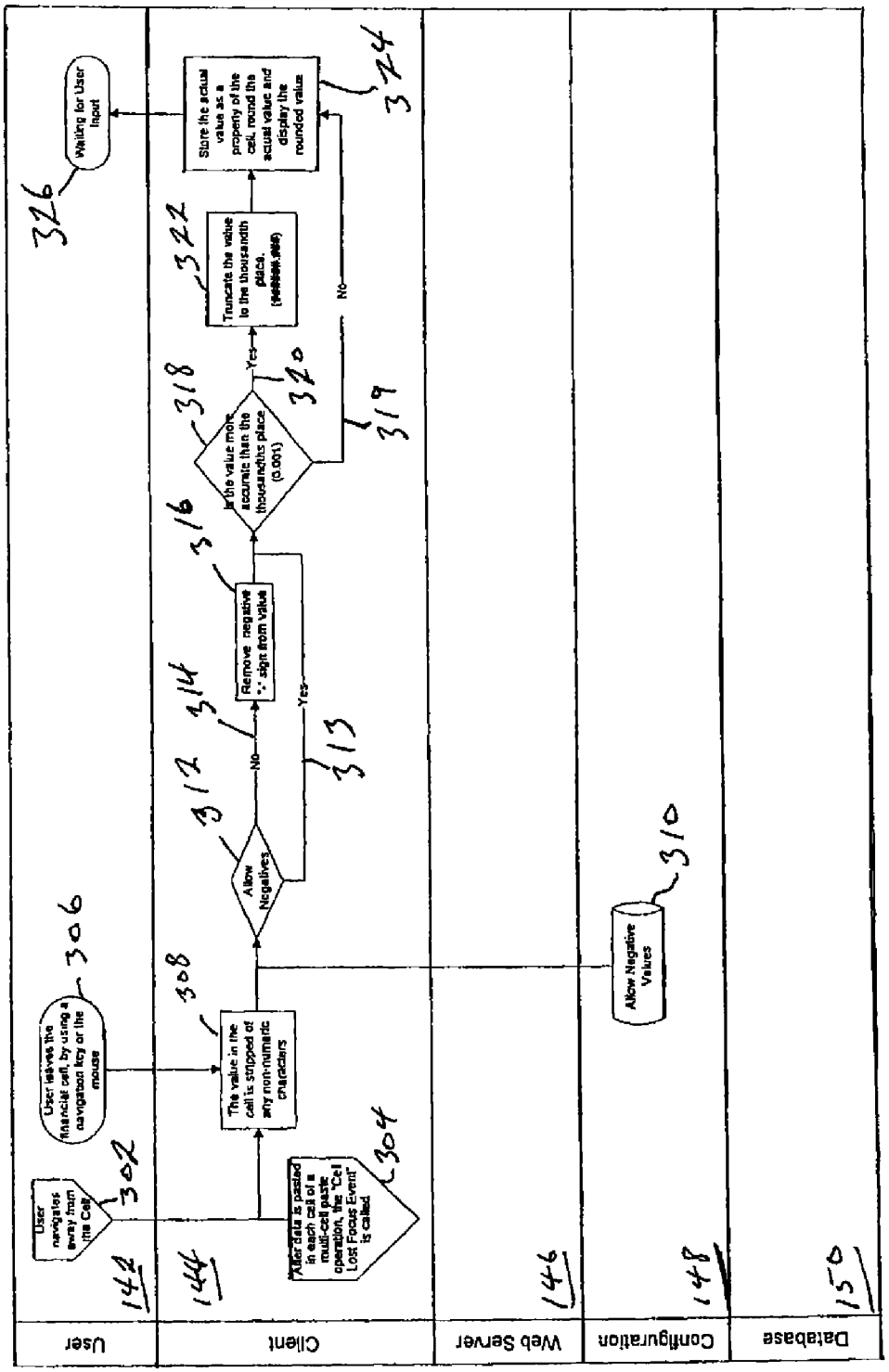
FIG. 6 is a system flow chart illustrating effecting a "Cell Lost Focus" event, with horizontal "swim lanes" indicating respective participants effecting particular action.

FIG. 6 is a system flow chart illustrating effecting a "Cell Lost Focus" event, with horizontal "swim lanes" indicating respective participants effecting particular action. In FIG. 6, a "Cell Lost Focus Logic" flow 300 includes swim lane indications 142, 144, 146, 148, 150 substantially similar to swim lanes indicated in FIGS. 4 and 5. Location of a flow element within a respective swim lane 142, 144, 146, 148, 150 is intended to indicate that the function represented by the flow element is effected by the entity related with the respective swim lane. Flow 300 begins with a user navigating away from a cell, as indicated by a flow element 302. A user moving away from a cell may occur, by way of example and not by way of limitation, in situations represented by flow elements 238, 244, 250, 252, 254, 256, 264, 270, 280, 290 in FIG. 5. Other occasions for calling flow 300 are, after data is pasted in each cell of a multi-cell paste operation (as indicated by a flow element 304; client swim lane 144) and when a user leaves a cell as by using a navigation key or a mouse input device (as indicated by a flow element 306; user swim lane 142). Flow 300 is substantially carried out at the client server (client swim lane 144). After flow 300 is initiated, the value of data in the cell moved away from is stripped of any non-numeric characters, as indicated by a flow element 308. Whether to permit negative values in the cell is a system constraint that is preferably determined during configuration and is stored in a configuration data store 310 (configuration swim lane 148). The constraint is employed in the posing of a query whether to allow negatives, represented by a flow element 312. If negative values are not allowed in the cell, flow 300 proceeds via a "No" path 314, the negative sign is removed from the value in the cell (as indicated by a flow element 316) and flow 300 proceeds to inquire whether the value in the cell is more accurate than three decimal places (as indicated by a flow element 318. If negative values are allowed in the cell, flow 300 proceeds via a "Yes" path 313 directly to flow element 318.

If the value in the cell is more accurate than three decimal places, flow 300 proceeds via "Yes" response line 320, flow 300 truncates the value in the cell to three decimal places (as indicated by a flow element 322) and the actual data value in the cell is stored as a property of the cell, as indicated by a flow element 324. Flow element 324 displays the actual value of data contained in the cell when the cell is highlighted or otherwise selected by a user. Otherwise a rounded figure representing data in the cell is displayed. If the value in the cell is not more accurate than three decimal places, flow 300 proceeds via "No" response line 319 directly to flow element 324. Flow 300 proceeds from flow element 324 to await another user input, as indicated by a flow element 326 (user swim lane 142).

Figure 7:
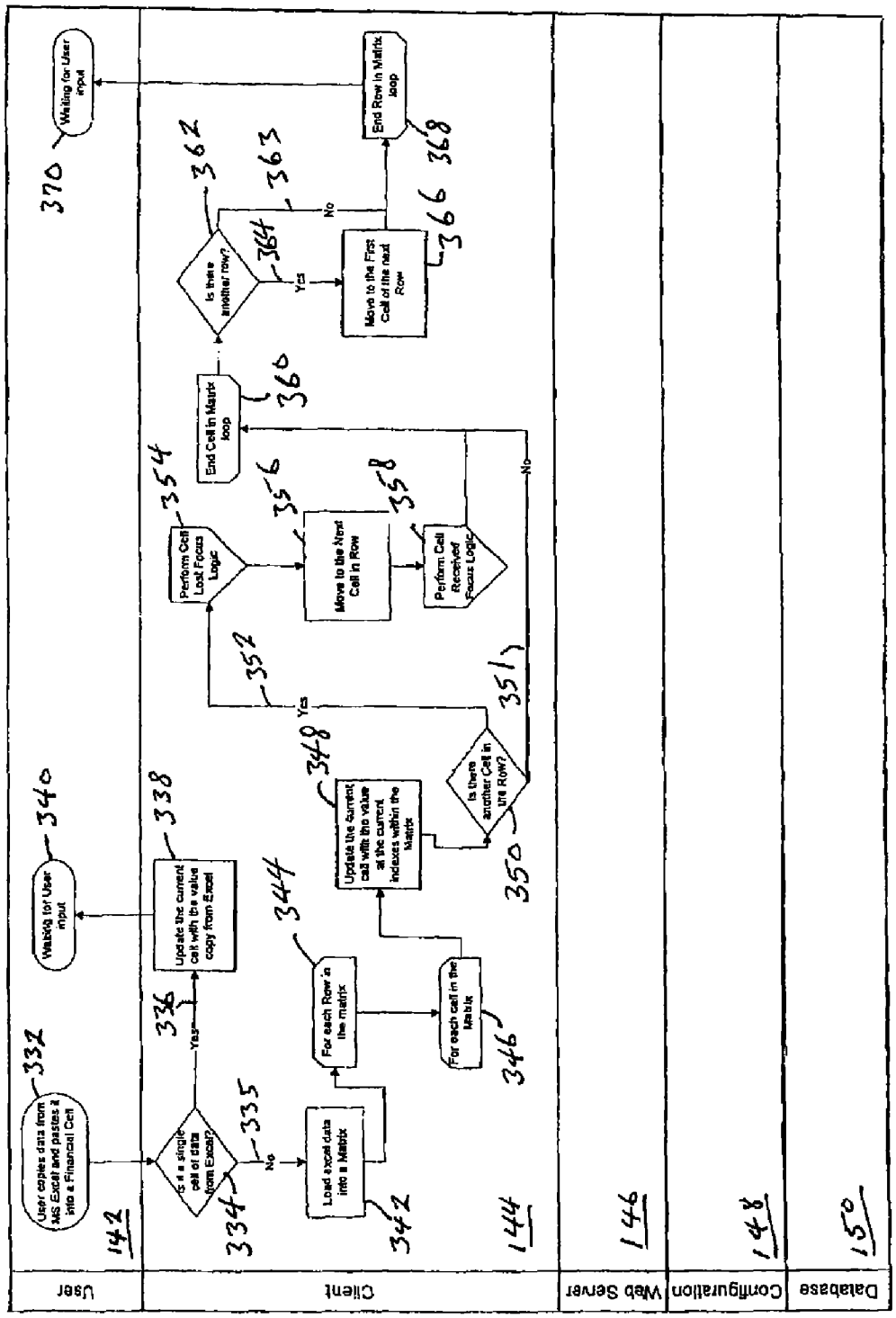
FIG. 7 is a system flow chart illustrating effecting a "Copy and Paste from Another Source" event, with horizontal "swim lanes" indicating respective participants effecting particular action.

FIG. 7 is a system flow chart illustrating effecting a "Copy and Paste from Another Source" event, with horizontal "swim lanes" indicating respective participants effecting particular action. In FIG. 7, a "Copy and Paste" flow 330 includes swim lane indications 142, 144, 146, 148, 150 substantially similar to swim lanes indicated in FIGS. 4-6. Location of a flow element within a respective swim lane 142, 144, 146, 148, 150 is intended to indicate that the function represented by the flow element is effected by the entity related with the respective swim lane.

Flow 330 begins with a user copying data from another program and pasting the copied data into a data cell of a financial grid configured according to the teachings of the present invention, as indicated by a flow element 332 (user swim lane 142). Flow 300 is substantially carried out at the client server (client swim lane 144). Flow 330 continues by inquiring whether the copied data is a single cell of copied data, as indicated by a flow element 334 (user swim lane 144). If the copied data is a single cell of copied data, flow 330 proceeds via a "Yes" path 336, the current cell is updated with the value of the copied data, (as indicated by a flow element 338) and flow 330 awaits another user input, as indicated by a flow element 340 (user swim lane 142). If the copied data is not a single cell of copied data flow, 330 proceeds via a "No" path 335 and the copied data is loaded into a matrix, as indicated by a flow element 342. Flow 330 continues for each row (flow element 344) in the matrix containing copied data and for each cell (flow element 346) in the matrix updating the current cell with the value of the current indexes within the matrix, as indicated by a flow element 348.

Flow 330 then inquires whether there is another cell in the current row, as indicated by a flow element 350. If there is another cell in the current row, flow 330 proceeds from flow element 350 via a "Yes" response line 352 and the system performs a "Cell Lost Focus" routine (see FIG. 6) is run, as indicated by a flow element 354. Flow 330 then moves to the next cell in the current row (as indicated by a flow element 356) and performs a "Cell Received Focus" routine (see FIG. 8), as indicated by a flow element 358. Flow 330 is then at the end cell in a row of the matrix loop, as indicated by a flow element 360. If there is not another cell in the current row, flow 330 proceeds from flow element 350 via a "No" response line 352 and the system proceeds directly to flow element 360.

Flow 330 proceeds from flow element 360 to inquire whether there is another row, as indicated by a flow element 362. If there is another row, flow 330 proceeds via a "Yes" response line 364 and the system moves to the first cell of the next row, as indicated by a flow element 366. Flow 330 is then at the end row of the matrix loop, as indicated by a flow element 368. If there is not another row, flow 330 proceeds from flow element 362 via a "No" response line 363 and the system proceeds directly to flow element 368. Flow 330 proceeds from flow element 368 to await another user input, as indicated by a flow element 370 (user swim lane 142).

Figure 8:
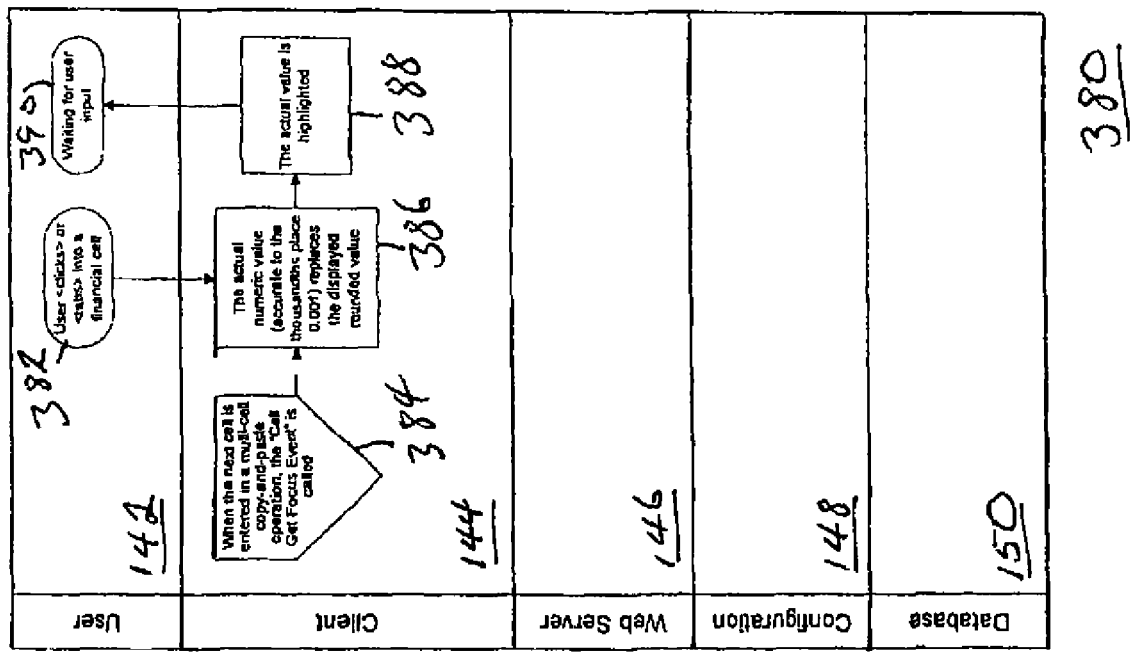
FIG. 8 is a system flow chart illustrating effecting a "Cell Received Focus" event, with horizontal "swim lanes" indicating respective participants effecting particular action.

FIG. 8 is a system flow chart illustrating effecting a "Cell Received Focus" event, with horizontal "swim lanes" indicating respective participants effecting particular action. In FIG. 8, a "Cell Received Focus Logic" flow 380 includes swim lane indications 142, 144, 146, 148, 150 substantially similar to swim lanes indicated in FIGS. 4-7. Location of a flow element within a respective swim lane 142, 144, 146, 148, 150 is intended to indicate that the function represented by the flow element is effected by the entity related with the respective swim lane.

Flow 380 begins with a user selecting a cell, as indicated by a flow element 382. Selecting a cell may be effected, by way of example and not by way of limitation, by a mouse click, by an actuation of a key or keys of a keyboard or by another input device actuation. Flow 380 continues by replacing the displayed rounded value (that was displayed before the cell was selected) with the actual numeric value stored in a data base for the selected cell. The actual value is preferably accurate to three decimal places. Alternatively, the client server may initiate flow 380 (as indicated by a flow element 384; client swim lane 144) when in a next cell entered in a multi-cell copy-and-paste operation the "Cell Get Focus Event" or the "Cell Received Focus Logic" is called, such as occurs in connection with flow element 358; FIG. 7. Flow 380 is substantially carried out at the client server (client swim lane 144).

Flow 380 proceeds from flow element 386 by highlighting the actual value now displayed in the selected cell, as indicated by a flow element 388. Flow 380 proceeds from flow element 388 to await another user input, as indicated by a flow element 390 (user swim lane 142).

Figure 9:
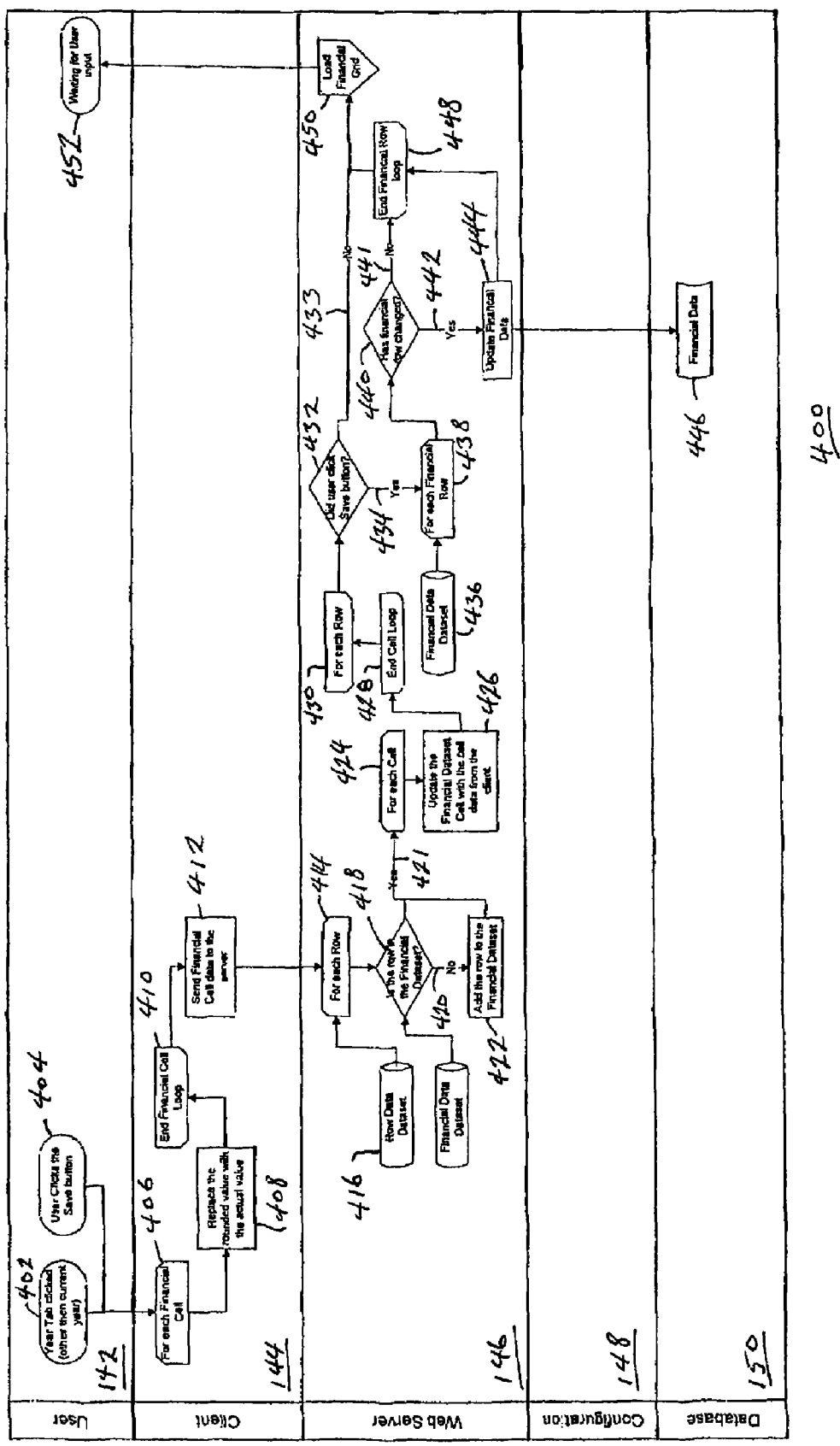
FIG. 9 is a system flow chart illustrating effecting a storing event, with horizontal "swim lanes" indicating respective participants effecting particular action.

FIG. 9 is a system flow chart illustrating effecting a storing event, with horizontal "swim lanes" indicating respective participants effecting particular action. In FIG. 9, a storing flow 400 includes swim lane indications 142, 144, 146, 148, 150 substantially similar to swim lanes indicated in FIGS. 4-8. Location of a flow element within a respective swim lane 142, 144, 146, 148, 150 is intended to indicate that the function represented by the flow element is effected by the entity related with the respective swim lane. Storing flow 400 may begin with a year tab being mouse-clicked (or otherwise selected) other than a current year, as indicated by a flow element 402, or may begin when a user exercises a SAVE command, as indicated by a flow element 404.

Flow 400 continues with the client server (client swim lane 144) replacing the rounded value in each affected cell (as indicated by flow elements 406, 408, 410). Storing flow thereafter sends data contained in the affected cells to the server, as indicated by a flow element 412 (web server swim lane 144). Flow 400 continues with, for each row affected (as indicated by a flow element 414), obtaining a row dataset from storage, as indicated by a flow element 416.

Flow 400 proceeds from flow element 414 to inquire whether the presently addressed row is in the financial dataset, as indicated by a flow element 418. If the presently addressed row is not in the financial dataset, flow 400 proceeds from flow element 418 via a "No" response line 420 and the presently addressed row is added to the financial dataset, as indicated by a flow element 422. Flow 400 continues with, for each cell affected (as indicated by a flow element 424), updating the affected cell (as indicated by a flow element 426) with the cell data received from the client server (as described in connection with flow element 412). If the presently addressed row is in the financial dataset, flow 400 proceeds from flow element 418 via a "Yes" response line 421 and the system proceeds directly to flow element 424. At the end of the cell loop addressing each cell (indicated b a flow element 428, flow 400 continues with a row loop (indicated by a flow element 430) and, for each row, poses a query whether the user exercised a SAVE command (as indicated by a flow element 432).

If the user exercised a SAVE command, flow 400 continues from flow element 432 via a "Yes" response line 434 to, for each row, compare the financial dataset received from the client server (represented by a flow element 436) with extant data within the row to inquire whether the row has changed (as represented by flow elements 436, 440). If the row has changed, flow 400 continues from flow element 440 via a "Yes" response line 442 and the financial data in the current row is updated (as indicated by a flow element 444) in a data base containing financial data (indicated by a flow element 446; database swim lane 150). If the row has not changed, flow 400 continues from flow element 440 via a "No" response line 441 and, if all rows have been addressed (flow element 430), the financial row loop is terminated, as indicated by a flow element 448. Flow 400 thereafter loads the financial grid (as indicated by a flow element 450 and flow 400 proceeds from flow element 450 to await another user input, as indicated by a flow element 452 (user swim lane 142).

If the user did not exercise a SAVE command, flow 400 continues from flow element 432 via a "No" response line 433 directly to flow element 450 and thereafter proceeds from flow element 450 to await another user input, as indicated by a flow element 452 (user swim lane 142).

Figure 10:
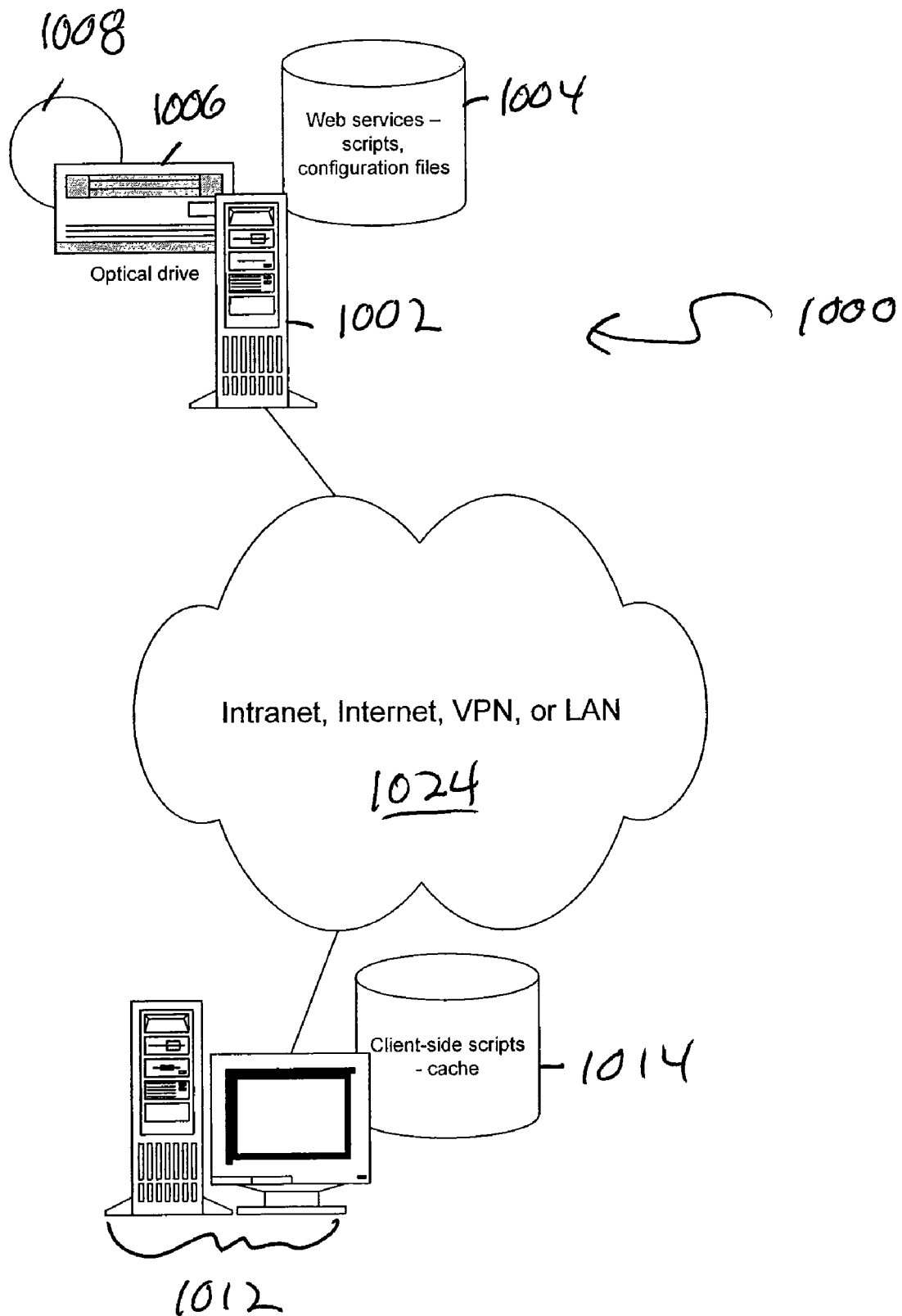
FIG. 10 is a network block diagram illustrating the operating environment of embodiments of the present invention.

FIG. 10 illustrates a typical operating environment for embodiments of the present invention. Server 1000 includes an instruction execution or processing platform, 1002. The system includes a fixed storage medium, illustrated graphically at 1004, for storing programs and/or macros that make up computer program code forming a computer program product, which enables an embodiment of the invention, including web server functionality, scripts, and the like. Configuration files can also be stored on medium 1004, although they could also be stored on a separate server. In this particular example, an optical drive, 1006, is connected to the computing platform for loading the appropriate computer program product into computer 1002 from an optical disk, 1008. Instruction execution platform 1002 of FIG. 10 can execute the appropriate instructions and display appropriate screens on display device 1012, using client-side scripts, which temporarily reside or are cached on medium 1004. FIG. 10 also shows a connection between server and client computer systems, which can be formed in part by network 1024, which can be an intranet, virtual private network (VPN) connection, local area network (LAN) connection, or any other type of network resources, including the Internet. The computer program code instructions implement an embodiment of the invention can reside on any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

By way of example and not by way of limitation, programming language JavaScript may be employed in cooperation with programming languages C# and ASP.NET to implement various aspects of the example embodiment of the present invention. In the example embodiment of the invention, client side code (i.e., code employed by a system designer) is implemented in JavaScript language. Programming code that provides control by a user is preferably implemented in ASP-.NET code and C# code provides an HTML (HyperText Markup Language) output format compatible with a web application.

The appendix contains detailed, commented, examples of programming code creating a Financial Grid on a Web page.

The present invention will be described herein in terms of specific exemplary embodiments. It is to be understood that the invention is not limited to the exemplary embodiments disclosed. It should also be understood that not every feature of the methods and systems described herein is necessary to implement the invention as claimed in any particular one of the appended claims. Various elements and features of various embodiments are described to fully enable the invention. In addition, throughout this disclosure, where a process or method is shown or descried, the steps of the method or process may be performed in any order or simultaneously, unless it is clear from the context that one step depends on another being performed first. Also, time lags between steps can vary. With respect to flow charts, block diagrams and flow diagrams, not every possible signal flow, data path, or process block may be shown. Rather, for clarity, only elements important to the inventive concepts being discussed relative to the drawing may be illustrated, although others may be discussed in this description.

Although specific embodiments of the invention have been illustrated and described herein, those of ordinary skill in relevant arts will appreciate what any arrangement which is calculated to achieve the same purpose as the invention may be substituted for a specific embodiment shown and that the invention may have other applications in other environments. This description is intended to cover any adaptations or variations of the present invention. The following claims are in no way intended to limit the scope of the invention to the specific embodiments described herein.

It is to be understood that, while the detailed drawings and specific examples given describe example embodiments of the invention, they are for the purpose of illustration only, that the apparatus and method of the invention are not limited to the precise details and conditions disclosed and that various changes may be made therein without departing from the spirit of the invention which is defined by the claims.

APPENDIX

The exemplary Financial Grid created here has two groupings, one grouping for the key field AccountHeaderID and the other grouping for the field ServiceProviderKey. For each of the groupings the value in KeyField and DisplayField must be columns in the RowData dataset along with the DetailRowKeyField and DetailRowDescriptionField set in PCM:FinancialTable that will be passed into the Grid on the code page.

ASPX Control

The following exemplary code registers the Financial Grid for use on the webpage.

```
<% @ Register Assembly="PCM.Web.UI. WebControls.FinancialGrid"
Namespace="PCM.Web.UI.WebControls.FinancialGrid"
TagPrefix="PCM" %>
```

The following exemplary code creates the control on the webpage. The RowData, Years, OriginalCellData, and CellData properties must be set before calling the DataBind( ) method.

```
<PCM:FinancialTable
    ID="Grid"
    OnYearTabClick="OnYearTab_Click"
    CurrentYear="2006"
    DetailRowDescriptionField="AccountDesc"
    FinancialTableContainerCssClass="FinancialGridContainer"
    FinancialTableCssClass="FinancialTable"
    DetailRowAlternateRowCssClass="Alt"
    ScollBarPlaceHolderCssClass="ScrollBarPlaceHolder"
    DetailRowDescriptionCellCssClass="DescCol"
YearTabCssClass="YearGrid"
    DetailRowTotalCellCssClass="TotalCol"
    DetailRowCellCssClass="Cell"
    DetailRowCssClass="DetailRow"
    DetailRowInputRowCssClass="RB"
    DetailRowInputCellCssClass="TB"
    DetailRowKeyField="Account"
    runat="server"
    DetailRowDecimalPlaces="0"
    Precision="3"
    DetailRowLockedInputCellCssClass="L"
    DetailRowTotalDecimalPlaces="1"
    DetailRowTotalDisplayZeroAs="-"
    AllowCopyAndPaste="true"
    AllowDirectEntry="false"
    AllowDragAndDrop="true"
    YearTotalDecimalPlaces="1"
    YearTotalDisplayZeroAs="-">
    <PCM:RowGrouping
        DisplayField="AccountHeader"
        RowCssClass="Grouping1"
        CellCssClass="Cell"
        DisplayZeroAs="-"
        DescriptionCellCssClass="DescCol"
        TotalCellCssClass="TotalCol"
        DecimalPlaces="1"
        KeyField="AccountHeaderID"
        runat="server">
    </PCM:RowGrouping>
    <PCM:RowGrouping
        DisplayField="ServiceProviderKeyName"
        RowCssClass="Grouping2"
        DecimalPlaces="1"
        DisplayZeroAs="-"
        DescriptionCellCssClass="DescCol"
        CellCssClass="Cell"
        TotalCellCssClass="TotalCol"
            KeyField="ServiceProviderKey"
        runat="server">
    </PCM:RowGrouping>
</PCM:FinancialTable>
```

C# Code

The following exemplary C# code is an example of loading the Grid in the codepage. Element this.Grid is a variable used to hold the Financial Grid.

Element GetFinancials returns a DataSet with 4 DataTables. Table[0] contains configuration data (this includes the years that data can be entered for, which year should be displayed on the initial load, and which columns are locked for each year. Table[1] contains Transaction info (not used in this context). Table[2] contains cell data that has been saved permanently in the database (columns include a field for row key field, as specified in the ASPX control (see above), any grouping keys, as specified in the ASPX control, and a column for each month (Jan, Feb, Mar, etc.)). Table[3] contains cell data that has been saved for later until the user is ready to submit the data (columns must match those in Table[2].

```
private void LoadGrid( ){

DataSet ds=Financials.GetFinancials (PCMID, FinancialTypeID, CurrentConnectionString, CommandTimeout);

this.GridConfig=ds.Tables[0];

int[ ] years=new int[this.GridConfig.Rows.Count];

for (int i=0; i<this.GridConfig.Rows.Count; i++){
    years[i]=(int)this.GridConfig.Rows[i] ["Year"];
    if ((bool)this.GridConfig.Rows[i]["DefaultYearFlag"]) {
```

```
this.Grid.CurrentYear=(int)this.GridConfig.Rows[i]
    ["Year"];
        }
    }
this.Grid.Years=years;
    this.Grid.OriginalCellData=ds.Tables[2];
    this.Grid.CellData=ds.Tables[3];
this.Grid.RowData=Financials.GetAccounts (PCMID,
FinancialTypeID, 0, CurrentConnectionString, Command-
Timeout);
this.Grid.TableKey=PCMID;
    SetGridConfig( )
    if (this.Year>-1) {
    this.Grid.CurrentYear=this.Year;
    }
    Once the Financial Grid is configured and the RowData,
Years, OriginalCellData, and CellData has been set the devel-
oper must call the DataBind( )method of the FinanicalTable to
bind the data to the Grid.
    this.Grid.DataBind( )

}
    Below is an example of configuring the Grid using values
from a DataTable in the codepage. Element this.Grid is a
variable used to hold the Financial Grid.
    private void SetGridConfig( ){
    This code is used to set properties based on configurations
values stored in a database. These properties can be set in the
ASPX page (see above), hard coded in the codepage, or from
a config file.
DataRow dr=this.GridConfig.Rows.Find (this.Grid.Current-
Year);
    The following code allows users to directly enter values
into the grid.
this.Grid.AllowDirectEntry=(bool)dr["DirectEntryFlag"];
for (int i=0; i<this.Grid.Months.Length; i++) {
    this.Grid.ColumnLocks[this.Grid.Months[i]]=(bool)dr
[this.Grid.Months[i]+"LockedFlag"];

}
    The following code allows users to copy and paste data.
this.Grid.AllowCopyAndPaste=this.Grid.AllowDirectEntry;
    The following code allows users to drag and drop data. In
addition to this property being set to true, user must also set
the various AllowTransfer properties to true, for drag and
drop between columns, rows, or groups to occur.
this.Grid.AllowDragAndDrop=(bool)dr["DragAndDrop-
Flag"];
    The following code allows users to drag and drop data
between columns.
this.Grid.AllowTransferToDifferentColumn=(bool)dr
["TransferColumnFlag"];
    The following code allows users to drag and drop data
between rows.
this.Grid.AllowTransferToDifferentDetailRow=(bool)dr
["TransferRowFlag"];
    The following code allows users to drag and drop data
between Service Providers.
this.Grid.RowGroupings[0].AllowTransferToDifferent-
Group=(bool)dr["TransferSPFlag"];
    The following code allows users to drag and drop data
between Account Headings.
```

```
this.Grid.RowGroupings[1].AllowTransferToDifferent-
Group=(bool)dr["TransferAccountFlag"];

}
```
Real-time total updating occurs whenever a value in a cell changes.

The groups are setup to round to the 0.1 place. Groups can be configured to be as precise as needed by setting the DecimalPlaces property of the RowGrouping.

```
<PCM:FinancialTable . . . >
<PCM:RowGrouping . . .
DecimalPlaces="1"
runat="server"/>
</PCM:FinancialTable>
```

As mentioned earlier herein, the example embodiment of the invention dynamically or real-time updates totaling and sub-totaling upon change of value in any data cell in the receiving data array. In order for such real-time total updating to work a number of properties may be added to the controls within the Financial Grid. An exemplary list of such added properties includes:

Control: Cell
  realValue—this is the value that was entered into the cell before rounding.
  originalValue—this is the value that the control was before editing it.
  rowIndex—used to locate the row the cell belongs to.
  cellIndex—the index within the row that cell is at.
Control: Row
  parentGroup—this is the id of the group that this row is a part of.
Control: GroupRow
  parentGroup—this is the id of the group that this row is a part of.
Control: GroupCell
  realValue—this is the value that was entered into the cell before rounding.
  rowIndex—used to locate the row the cell belongs to.
  cellIndex—the index within the row that cell is at.
  valueChanged This function is called whenever the value in a cell changes.

The valueChanged function takes the difference of the last value and the new value in a data cell, adds that difference value to the total column and calls rollupValueChange.

```
function valueChanged(ele) {
    if(!ele.isL) {
        var rowKey, columnKey, tableKey, precision;
        var valChange = 0;
        precision = new Number(this.Precision);
        if(ele.value != ele.realV) {
            if(ele.value != empty) {
                ele.value = common.round(ele.value,
                    precision);
            }else{
                ele.value = "0";
            }
        . . .
            valChange = (new Number(ele.value) − new
                Number(ele.realV));
        . . .
        if(ele.TableKey) {
                tableKey = ele.TableKey;
            }else{
                tableKey = this.TableKey;
            }
```

-continued

```
        rowKey = element.document.all(tableKey +
            "R" + ele.rIndex).rowKey;
        columnKey = aMonths[ele.cIndex];
    ...
        var ctl = element.document.all(tableKey
            + "R" + ele.rIndex + "CTotal");
        ctl.realV = common.round(new
            Number(ctl.realV) + new
            Number(valChange), precision);
        if(new Number(ctl.realV) == 0) {
            ctl.innerHTML =
                this. totalDisplayZeroAs;
        }else{
            ctl.innerHTML =
                common.round(ctl.realV, new
                Number(this.totalDecimalPlaces));
        }
        rollupValueChange(tableKey,
            element.document.all(tableKey + "R" +
            ele.rIndex).parentGroup, ele.cIndex,
            valChange);
        }
    ...
    }
}
``` rollupValueChange

This is a recursive function which will keep calling itself until there are no more parent groups.

It adds the valChange (the difference of the last value and the new value) to the columnIndex column referenced and total column for the group. Function rollupValueChange is called for the group's parent group.

```
function rollupValueChange(tableKey, group, columnIndex,
    valChange) {
    try{
        if(group != "") {
            var ctl;
            var val;
            var precision = new
                Number(this.Precision);
            var places = new
                Number(element.document.all(tableKey +
                "G" + group).decimalPlaces);
            var disp = element.document.all(tableKey
                + "G" + group).displayZeroAs;
            ctl = element.document.all(tableKey +
                "G" + group + "C" + columnIndex);
            val = new Number(common.round(new
                Number(ctl.realV) + new
                Number(valChange), precision));
            ctl.realV = val;
            if(val == 0) {
                ctl.innerHTML = disp;
            }else{
                ctl.innerHTML = common.round(val,
                    places);
            }
            ctl = element.document.all(tableKey +
                "G" + group + "CTotal");
            val = new Number(common.round(new
                Number(ctl.realV) + new
                Number(valChange), precision));
            ctl.realV = val;
            if(val == 0) {
                ctl.innerHTML = disp;
            }else{
                ctl.innerHTML = common.round(val,
                    places);
            }
            rollupValueChange(tableKey,
                getParentGroup(tableKey, group),
                columnIndex, valChange);
        }
```

```
    }catch(e) {
        window.status = "An error occurred that may
            not allow totals to be accurately calculated!"
    }
}
getParentGroup
This function gets the Parent Group of the passed in group.
function getParentGroup(tableKey, group) {
    try{
        return element.document.all(tableKey + "G" +
            group).parentGroup;
    }catch(e) {
        window.status = "An error occurred that may
            not allow totals to be accurately calculated!"
    }
}
```

Round

This function takes a value and to what decimal place to round the value. The function strips out all non-numeric characters and rounds to the specified decimal places.

```
round : function (value, places) {
    var re = /[^0-9]*/;
    var rNumber = 0;
    var num1 = "";
    var num2 = "";
    var isNeg;
    if(value.toString( ).substring(0,1) == "−") {
        isNeg = true;
    }
    if(value.toString( ).substring(0, 1) == ".") {
        value = "0" + value;
    }
    var num = value.toString( ).split(".", 2);
    if(num[0]) {
        for(var i=0;i<num[0].length;i++) {
            num1 + = num[0].charAt(i).replace(re,
                "");
        }
    }
    if(num[1]) {
        for(var i=0;i<num[1].length;i++) {
            num2 + = num[1].charAt(i).replace(re,
                "");
        }
        while(num2.match(/0\b/)) {
            num2 = num2.replace(/0\b/, "");
        }
    }
    if((num1 != "") || (num2 != "")) {
        if(num2) {
            if (places == 0) {
                rNumber = Math.round(num1 + "." +
                    num2);
            }else if(num2.length <= places) {
                rNumber = num1 + "." + num2;
            }else{
                var part1 = num2.slice(0, places);
                var part2 = num2.slice(places);
                var leadingZeros = "";
                while(part1.match(/ \b0/)) {
                    part1 = part1.replace(/ \b0/, "");
                    leadingZeros + = "0";
                }
                var part1Len = part1.length;
                part2 = new
                    Number(part2.substring(0, 1));
                if(part2 < 5) {
                    rNumber = num1 + "." +
                        leadingZeros + part1;
                }else{
                    part1 = new Number(part1) + 1;
                    if(part1.toString( ).length >
                        part1Len) {
```

-continued

```
                 if(leadingZeros ==
                 "") {
                     rNumber = new
                     Number(num1) + 1;
                 }else{
                     leadingZeros =
                     leadingZeros.substring(0,
                     leadingZeros.length − 1);
                         rNumber = num1 + "." +
                         leadingZeros + part1;
                     }
                 }else{
                     rNumber = num1 + "." +
                     leadingZeros + part1;
                 }
             }
         }
     }else{
         rNumber = num1;
     }
 }
 return (isNeg ? "−" : " ") + rNumber; ;
}
```

By way of example and not by way of limitation, the Financial Grid can be locked in a number of different ways, such as Row Locking, Column Locking, and Drag-Drop Locking.

All locks placed on the server-side (locks are placed on the server-side by setting the property is L=True) are handled on the client-side. isL is an expanded property created specifically for the purpose of passing that state of the control's lock.

When a row is locked users cannot input or drag-in data of any cells in the row. Users have the ability to drag-out data of the cell into cells of a non-locked row.

In the JavaScript code examples, the term "this" refers to the Financial Grid.

Row locking is enforced when passing the RowData (a DataTable that consists of Rowkey, RowDescription, LockedFlag, and any grouping Key and grouping Descriptions that were configured in the Financial Grid). If the LockedFlag is set to True then the Row will be locked.

Row locks are locked from direct entry by setting the readonly property of the input text box for each cell in the row to True and adding the is L property to the row. The drag-in lock is enforced in the drag-drop events handled by the JavaScript.

```
this.ondragover = function( ){
    if(isFinancialControl(event.srcElement)){
        setInactiveProcess( );
        if(event.srcElement.id != event.dataTransfer.getData("Text")){
            var ctl =
            element.document.all(event.dataTransfer.getData("Text"));
                if((ctl) && (isFinancialControl
                (event.srcElement)) &&
                (event.srcElement.dType == ctl.dType)){
                if( (isCell(ctl)) && (!event.srcElement.isL) ){
                ...
                }else if( (isRow(ctl)) && (!event.srcElement.isL) ){
                ...
                if(canTransferRow(ctl, event.srcElement)){
                    event.dataTransfer.dropEffect = "copy";
                    return false;
                }
            }
        }
    }
}
event.dataTransfer.dropEffect = "none";
```

-continued

```
    return false;
};
this.ondrop = function( ){
    try{
        var sCtl = event.dataTransfer.getData("Text");
        event.returnValue = false;
        event.cancelBubble = true;
        element.document.all("infoPopup").style.display = "none";
        dragStopped( );
        if(isFinancialControl(event.srcElement)){
            if((event.srcElement.id != sCtl)){
                var ctl = element.document.all(sCtl);
                if((isCell(event.srcElement)) && (isCell(ctl)) ){
                ...
                }else if( (isRow(event.srcElement)) && (isRow(ctl)) ){
                    event.dataTransfer.dropEffect = "copy";
                    for(i=0;i<aMonths.length;i++){
                        var sourceCtl = element.document.all(sCtl +
                        "C" + i); sourceCtl.TableKey = ctl.TableKey;
                        var targetCtl = element.document.all
                        (event.srcElement.id + "C" + i);
                        targetCtl.TableKey = this.TableKey;
                        if( (!sourceCtl.isL) && (!targetCtl.isL) ){
                            transferAmounts(sourceCtl, targetCtl, new
                            Number(sourceCtl.realV));
                        }
                    }
                }
                ctl.fireEvent("onfocusout");
                event.srcElement.fireEvent("onfocusin");
                event.srcElement.focus( );
                return true;
            }
        }
        event.dataTransfer.dropEffect = "none";
        element.document.all(sCtl).fireEvent("onfocusin");
    }catch (e){
        ...
    }
};
```

When a column is locked users cannot input, drag-in, or drag-out data of any cells in the column. Column Locking is enforced by setting a column in the Financial Grid's ColumnLocks dictionary to True. For example: To lock the month of March, use the following syntax: Grid.ColumnLocks ["Mar"]= True. ColumnLocks uses the 3 character month description: Jan, Feb, Mar, Apr, May, Jun, Jul, Aug, Sep, Oct, Nov, Dec.

Column locks are locked from direct entry by setting the readonly property of the input text box for the cell to True and setting the is L property for the cell. The drag-drop lock is enforced by checking for the is L property in the cell. If the drag-drop lock exists, then a Drag-Drop operation is not allowed.

Drag-Drop locking can be enforced for the entire grid, at any grouping level, at the row level or at the column level. To enable Drop-Drop in the Financial Grid: Grid.AllowDragAndDrop=True.

To allow Drag-Drop between columns set Grid.AllowTransferToDifferentColumn=True.

To allow Drag-Drop between rows of the same grouping set Grid.AllowTransferToDifferentDetailRow=True.

To allow Drag-Drop between rows that belong to a different grouping, use the index of the grouping and set its AllowTransferToDifferentGroup property to True. Frid. RowGroupings[0]. AllowTransferToDifferentGroup=True;

Exemplary code that allows drag-drop is set forth below. This code is called from the various Drag-Drop events to ensure that data cannot be transferred unless specifically setup to do so.

```
function canTransferCell(cell1, cell2){
        var row1 = element.documentall(cell1.TableKey + "R" + cell1.rIndex);
        var row2 = element.document.all(cell2.TableKey + "R" + cell2.rIndex);
        row1.TableKey = cell1.TableKey;
        row2.TableKey = cell2.TableKey;
            if(!row2.isL){
                    if(cell1.rindex == cell2.rIndex){
                            if(cell1.cIndex == cell2.cIndex){
                                    window.status = "";
                                    return true;
                            }else if(this.AllowColumnTransfer){
                                    window.status = "";
                                    return true;
                            }else{
                                    window.status = "Transfer between Months is
                                    not allowed!";
                                    return false;
                            }
                    }else if((cell1.cIndex == cell2.cIndex) ||
                    (this.AllowColumnTransfer)){
                    return canTransferRow(row1, row2);
                    }else{
                            window.status = "Transfer between Months is not
                            allowed!";
                            return false;
                    }
            }else{
                    window.status = "You cannot transfer into a locked row!";
                    return false;
            }
        }
function canTransferRow(row1, row2){
        if(row1.rowKey == row2.rowKey){
           window.status = "";
           return true;
        }
        if( (this.AllowRowTransfer) ){
           if( (row1.parentGroup) && (row2.parentGroup) ){
              if( (row1.parentGroup == row2.parentGroup) ){
                 window.status = "";
                 return true;
                 }else{
                      var group1 = element.documentall(row1.TableKey + "G" +
                      row1.parentGroup);
                      var group2 = element.document.all(row2.TableKey + "G" +
                      row2.parentGroup);
                      group1.TableKey = row1.TableKey;
                      group2.TableKey = row2.TableKey;
                      return canTransferGroup(group1, group2);
                 }
             }else{
                  window.status = "";
                  return true;
             }
         }else{
             window.status = "Transfer between Accounts is not allowed!";
             return false;
         }
     }
function canTransferGroup(group1, group2){
        if( (group1) && (group2) ){
             if( (group1.parentGroup) == (group1.parentGroup) ){
                  if( (group1.allowTransfer) && (group2.allowTransfer) ){
                      return true;
                  }else{
                          window.status = "Transfer between" + group1.innerHTML +
                          "and" + group2.innerHTML + "is not allowed!";
                          return false;
            }
                  }
                  var parent1 = element.documentall(group1.TableKey + "G" +
                  group1.parentGroup);
                  var parent2 = element.document.all(group2.TableKey + "G" +
                  group2.parentGroup);
                  if( (parent1) && (parent2) ){
                          parent1.TableKey = group1.TableKey;
                          parent2.TableKey = group2.TableKey;
                          return canTransferGroup(parent1, parent2);
```

-continued

```
        }else{
                window.status = "Transfer between" + group1.innerHTML + "and" +
group2.innerHTML + "is not allowed!";
                return false;
        }
            }else{
                window.status = "Transfer not allowed!";
                return false;
            }
        }
```

We claim:

1. A method for treating data comprising:

(a) establishing an array in a first domain with a plurality of cells arranged in a plurality of rows and a plurality of columns; said establishing being effected according to a defining protocol establishing criteria regarding selected cells of said plurality of cells;

(b) selecting said data from a data source in a second domain;

(c) entering said data in said array in respective cells of said plurality of cells according to predetermined placement criteria; and (d) substantially as entered data arrives in said array, validating said entered data to impose conformance with predetermined characteristics in said first domain, wherein validating includes removing non-numeric characters from said data and truncating numerical data to a predetermined decimal place.

2. A method for treating data as recited in claim 1 wherein said first domain is a web-configured domain.

3. A method for treating data as recited in claim 2 wherein particular cells of said plurality of cells are totaling cells; a respective totaling cell being filled with calculated data indicating a total of selected cells within a respective row of said plurality of rows containing said respective totaling cell, or a total of selected cells within a respective column of said plurality of columns containing said respective totaling cell; said predetermined placement criteria precluding entering said data in a respective totaling cell.

4. A method for treating data as recited in claim 2 wherein manipulation of said data in said array is effected according to functions associated with said array.

5. A method for treating data as recited in claim 1 wherein particular cells of said plurality of cells are totaling cells; a respective totaling cell being filled with calculated data indicating a total of selected cells within a respective row of said plurality of rows containing said respective totaling cell, or a total of selected cells within a respective column of said plurality of columns containing said respective totaling cell; said predetermined placement criteria precluding entering said data in a respective totaling cell.

6. A method for treating data as recited in claim 1 wherein manipulation of said data in said array is effected according to functions associated with said array.

7. A method for displaying and employing data; the method comprising:

(a) defining an array of data sites in a first domain; said defining including establishing procedures for manipulating said data located at said data sites;

(b) importing said data from a data source in a second domain to selected said data sites according to predetermined installation criteria;

(c) employing said imported data according to said procedures for manipulating; and (d) validating said data to impose conformance with predetermined characteristics in said first domain, wherein said validating includes removing non-numeric characters from said data and truncating numeric data to a predetermined decimal place.

8. A method for displaying and employing data as recited in claim 7 wherein said first domain is a web-configured domain.

9. A method for displaying and employing data as recited in claim 8 wherein said array of data sites includes a plurality of cells arranged in a plurality of rows and a plurality of columns; particular cells of said plurality of cells being totaling cells; a respective totaling cell being filled with calculated data indicating a total of selected cells within a respective row of said plurality of rows containing said respective totaling cell, or a total of selected cells within a respective column of said plurality of columns containing said respective totaling cell; said installation criteria precluding entering said data in a respective totaling cell.

10. A computer program product including a medium with computer program code for treating data embodied therein, the computer program code comprising:

(a) instructions for establishing an array in a first domain with a plurality of cells arranged in a plurality of rows and a plurality of columns; said establishing being effected according to a defining protocol establishing criteria regarding selected cells of said plurality of cells;

(b) instructions for selecting said data from a data source in a second domain;

(c) instructions for entering said data in said array in respective cells of said plurality of cells according to predetermined placement criteria; and (d) instructions for substantially as entered data arrives in said array, validating said entered data to impose conformance with predetermined characteristics in said first domain, wherein validating includes removing non-numeric characters from said data and truncating numeric data to a predetermined decimal place.

11. A computer program product as recited in claim 10 wherein said first domain is a web-configured domain.

12. A computer program product as recited in claim 11 wherein particular cells of said plurality of cells are totaling cells; a respective totaling cell being filled with calculated data indicating a total of selected cells within a respective row of said plurality of rows containing said respective totaling cell, or a total of selected cells within a respective column of said plurality of columns containing said respective totaling cell; said predetermined placement criteria precluding entering said data in a respective totaling cell.

13. A computer program product as recited in claim 11 wherein manipulation of said data in said array is effected according to functions associated with said array.

14. A computer program product as recited in claim 10 wherein particular cells of said plurality of cells are totaling cells; a respective totaling cell being filled with calculated data indicating a total of selected cells within a respective row of said plurality of rows containing said respective totaling cell, or a total of selected cells within a respective column of said plurality of columns containing said respective totaling cell; said predetermined placement criteria precluding entering said data in a respective totaling cell.

15. A computer program product as recited in claim 10 wherein manipulation of said data in said array is effected according to functions associated with said array.

* * * * *